UNITED STATES PATENT OFFICE.

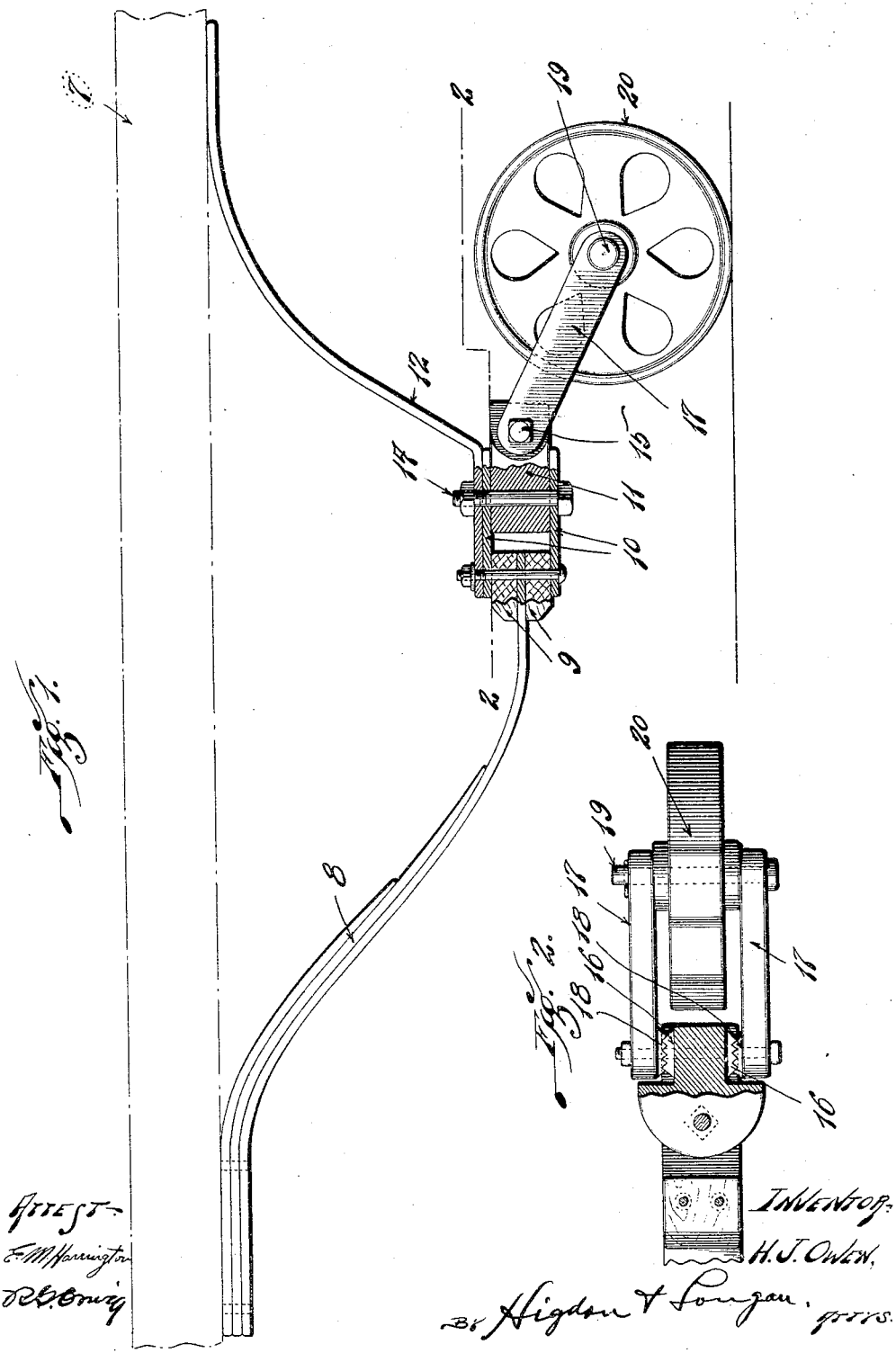

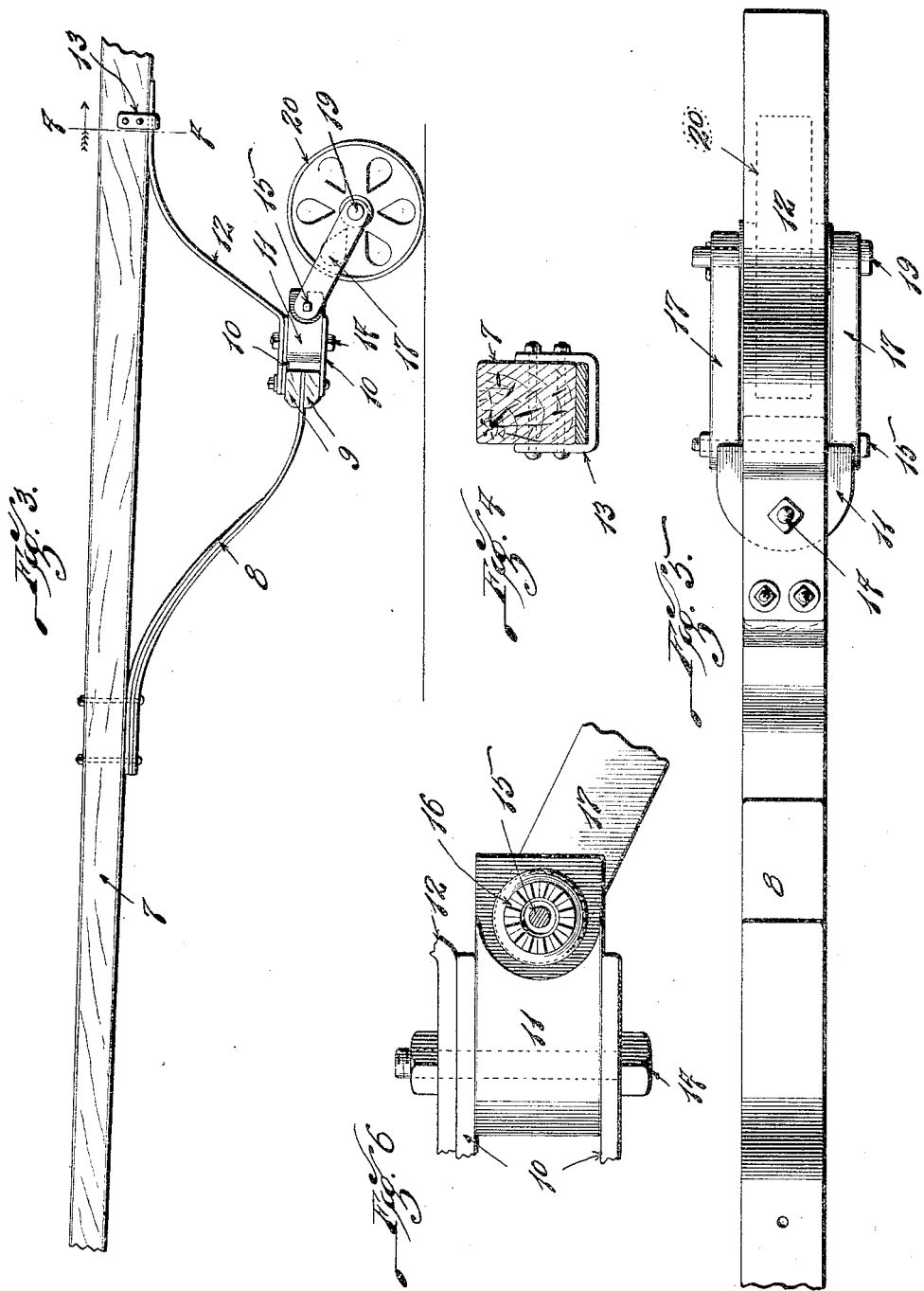

HENRY J. OWEN, OF PRAIRIE DU ROCHER, ILLINOIS, ASSIGNOR OF ONE-HALF TO THOMAS J. CONNER, OF PRAIRIE DU ROCHER, ILLINOIS.

TONGUE-SUPPORT.

1,112,719.  Specification of Letters Patent.  Patented Oct. 6, 1914.

Application filed December 16, 1913. Serial No. 806,997.

*To all whom it may concern:*

Be it known that I, HENRY J. OWEN, a citizen of the United States, and resident of Prairie du Rocher, Randolph county, Illinois, have invented certain new and useful Improvements in Tongue-Supports, of which the following is a specification containing a full, clear, and exact description, reference being had to the accompanying drawings, forming a part hereof.

My invention relates to improvements in tongue supports, and the object of my invention is to construct a yielding wheeled support for a tongue which is provided with a means for adjusting the height of the support to adapt the tongue to different conditions of work.

With the above purpose in view my invention consists in certain novel features of construction and arrangement of parts as will be hereinafter more fully described, pointed out in the claim and illustrated by the accompanying drawings, in which—

Figure 1 is an elevation partly in section of my improved tongue support; Fig. 2 is a sectional plan taken approximately on the line 2—2 of Fig. 1; Fig. 3 is an elevation of the complete support as applied to a tongue; Fig. 4 is an enlarged detail transverse sectional elevation taken on the line 4—4 of Fig. 3; Fig. 5 is a plan of the tongue support detached from the tongue; and Fig. 6 is an enlarged detail fragmental elevation showing the pivoted caster block and the integral means thereupon for holding the caster arms.

Referring by numerals to the accompanying drawings: 7 designates a tongue of ordinary construction. Secured to the underneath face of the tongue in advance of the double tree (not shown) is a leaf spring 8. This spring is preferably of the laminated leaf variety and is secured to the tongue by means of a pair of bolts extending through the leaves of the spring and the tongue.

The rear end of the leaf spring 8 is secured between blocks 9 carried by a frame 10 in which is secured a caster block 11.

Extending from the frame 10 and rigidly secured thereto is a leaf spring 12, the rearmost end of which is held in place against the bottom face of the tongue by means of a clip 13 in such manner as to permit longitudinal movements of the spring 12 relative to the tongue.

The caster block 11 is pivotally secured in the frame 10 upon a pin 14 and formed through the rear end of the caster block is an opening arranged to receive a bolt 15. Formed on the face of the caster block surrounding the hole for the bolt 15 is a ratchet face 16. Carried by the bolt 15 is a pair of arms 17 each of which is provided with ratchet faces 18 arranged to co-act with the ratchet faces 16 on the caster block to hold the arms 17 in any desired position. At the free ends of the arms 17 there is a pin 19 arranged for the support of a caster wheel 20.

It is obvious from this construction and arrangement of parts that the free forward end of the tongue may be supported at any desired height by shifting the positions of the arms 17 which support the caster wheel, and by reason of the spring 8 and 12 the vertical whipping of the tongue is obviated.

I claim:

A tongue support, comprising a laminated leaf spring fixedly secured to the tongue, a second leaf spring secured to the tongue in such manner as to permit lengthwise movements relative to the tongue, a caster block pivotally secured to said springs, a pair of arms adjustably pivotally secured to said caster block so that they may be placed at any desired angle relative to the caster block, and a caster wheel carried by the free ends of said arms.

In testimony whereof I have signed my name to this specification, in presence of two subscribing witnesses.

HENRY J. OWEN.

Witnesses:
W. HARRY TOWNER,
HARRY LA CHANCE..

Copies of this patent may be obtained for five cents each, by addressing the "Commissioner of Patents, Washington, D. C."